(12) United States Patent
Buresch et al.

(10) Patent No.: US 6,901,730 B1
(45) Date of Patent: Jun. 7, 2005

(54) END HOOD EXTENSION FOR A CORN HEADER

(75) Inventors: Michael A. Buresch, Geneseo, IL (US); Treg Shidler, Eldridge, IA (US); John L. VandeWiele, Moline, IL (US)

(73) Assignee: CNH America LLC, Racine, WI (US)

(*) Notice: Subject to any disclaimer, the term of this patent is extended or adjusted under 35 U.S.C. 154(b) by 0 days.

(21) Appl. No.: 10/737,484

(22) Filed: Dec. 16, 2003

(51) Int. Cl.$^7$ ............................................. A01D 45/02
(52) U.S. Cl. ...................................................... 56/314
(58) Field of Search ............................ 56/119, 314, 17.3, 56/319, 109

(56) References Cited

U.S. PATENT DOCUMENTS

| | | | | |
|---|---|---|---|---|
| 2,632,991 A | * | 3/1953 | Schwartz | 56/314 |
| 2,751,744 A | | 6/1956 | Reade et al. | 56/119 |
| 2,836,026 A | | 5/1958 | Gray et al. | 56/119 |
| 3,596,454 A | * | 8/1971 | Kluck | 56/254 |
| 3,881,305 A | | 5/1975 | Burrough | 56/257 |
| 4,199,927 A | * | 4/1980 | Craig et al. | 56/314 |
| 4,214,422 A | | 7/1980 | McMillen | 56/119 |
| 4,249,366 A | | 2/1981 | Dolberg et al. | 56/98 |
| 4,333,304 A | | 6/1982 | Greiner et al. | 56/116 |
| 4,903,468 A | | 2/1990 | Haberkorn | 56/16.4 |
| 5,444,968 A | | 8/1995 | Barton | 56/119 |
| 5,724,797 A | * | 3/1998 | Wagstaff et al. | 56/53 |
| 5,761,893 A | | 6/1998 | Lofquist et al. | 56/94 |
| 5,775,076 A | | 7/1998 | Mossman | 56/119 |
| 5,787,697 A | | 8/1998 | Post | 56/119 |
| 5,862,657 A | * | 1/1999 | Saurette | 56/119 |
| 6,715,273 B2 | * | 4/2004 | Weichholdt | 56/314 |

* cited by examiner

*Primary Examiner*—Robert E. Pezzuto
*Assistant Examiner*—Alicia Torres
(74) *Attorney, Agent, or Firm*—Brant T. Maurer; Rebecca Henkel

(57) ABSTRACT

The extension includes a support member including a mounting end mountable to a corn header adjacent to a rear end thereof for pivotable movement about a generally upwardly to downwardly extending pivotal axis between at least one forwardly extending position spaced above the end hood, and a second or stored position at angle to the forwardly extending position or positions. The support member has a free end extending upwardly and outwardly from the mounting end to a terminal end portion, and supports a sheet along substantially the length thereof to serve as a barrier to the passage of corn between the support member and the end hood and to deflect ears that strike it into an adjacent crop gathering channel. When it is not desired or required to use the extension it can be quickly and easily pivoted to the stored position, out of the way.

12 Claims, 3 Drawing Sheets

END HOOD EXTENSION FOR A CORN HEADER

TECHNICAL FIELD

This invention relates generally to an extension for an end hood of a corn header, and more particularly, to an end hood extension which is mounted for pivotal movement between at least one deployed or operative position above the end hood for deflecting and guiding upper portions of standing corn plants toward an adjacent crop gathering channel, and a second or stored position away from the end hood, which is advantageous under certain conditions, such as when harvesting downed corn.

BACKGROUND ART

Many corn headers for agricultural combines are presently built and supported so as to be positionable relatively close to the ground when propelled in a forward direction over a field, so as to be better capable of harvesting corn downed by high winds, driven rain, snow, hail, insect infestations such as corn borers, and the like. A corn header typically includes a pair of end hoods, one at each sideward end of the header, and a plurality of crop dividers at spaced intervals between the end hoods, also known as snouts, which separate and define a plurality of forward to rearward extending crop gathering channels, including one channel beside each end hood, for receiving the rows of corn as the corn header is moved forwardly over the field. Each crop gathering channel typically includes apparatus such as gathering chains and snapping rolls for stripping and separating the ears from the stalks and directing the ears into an auger which carries them to the inlet of a feeder of the combine.

A problem that has been observed, however, is that the end hoods of the lower headers are also lower compared to earlier models, which can result in ears of corn from upper portions of taller standing corn plants having a greater tendency to fall or otherwise be lost over the end hood when being harvested. The stalks of the taller plants holding the ears can also bend or fold sidewardly over the end hood such that the ears are not easily and regularly brought into the crop gathering channel and thus are lost.

To prevent or limit such losses, numerous guide apparatus, deflectors, and extensions for the end hoods of corn headers are known. Reference, for instance, Greiner et al., U.S. Pat. No. 4,333,304, which discloses a crop guide apparatus including means which extend forwardly along the end hood and a cross bar apparatus for blocking and limiting further rearward movement of upper portions of stalks, which means and cross bar are adjustable upwardly and downwardly and sidewardly to a limited extent to compliment adjustability of the row crop dividers and to accommodate a variety of row crop widths and heights. Reference also Mossman U.S. Pat. No. 5,775,076, which discloses a fender extension for a corn harvester which utilizes a flexible plastic sheet supported on a rearwardly extending cantilevered portion mounted at a forward location on an end divider or hood for deflecting the corn ears into the crop gathering area.

Such known devices may work well for standing corn. However, in some instances, it is anticipated that it would be better not to use such devices, particularly when harvesting downed corn, and the devices are not easily removable or movable out of the way, particularly when a harvesting operation will entail harvesting some areas of standing corn and some of downed corn. This may arise, for instance, when planting varieties of corn that are resistant to insects such as corn borers. When planting varieties of corn that are genetically modified to be insect resistant, farmers are often encouraged to plant some areas or rows with a non-insect resistant variety of corn, to retard or prevent the occurrence of the targeted insects becoming resistant to or overcoming the insect repellence or resistance aspects in the corn. As a result, this non-resistant corn is more likely to become infested and downed by the insect infestation. Harvesting downed corn can be difficult, as the corn may fall in different directions and become tangled. When harvesting the downed corn, the corn header is typically lowered and driven into the corn plants, which may tend to drape over and envelope the snouts. If guide apparatus, deflectors, or extensions are present, the corn plants may be pushed forward by them, or can snag on them so as to require manual clearance and removal. An anticipated shortcoming, therefore, of the known devices is that, although some are adjustable to some extent, and/or may be removable with significant effort, they are not quickly and easily movable from a deployed position to an out of the way or stored position or location while still remaining on the corn head, for those instances when use is not desired or required, and then back to the deployed position.

Thus, what is sought is an extension or deflector for an end hood of a corn header that overcomes many of the shortcomings and limitations set forth above.

SUMMARY OF THE INVENTION

According to the present invention, an extension for a forwardly to rearwardly extending end hood of a corn header which overcomes many of the shortcomings and limitations set forth above, is disclosed. In a preferred aspect of the invention, the extension includes a support member including a mounting end or element mountable to the header adjacent to a rear end of the end hood. The support member is pivotable about a generally upwardly to downwardly extending pivotal axis between at least one first or deployed position extending forwardly and spaced above the end hood, and a second or stored position at about a 90 degree angle about the pivotal axis to the forwardly extending or deployed position or positions, behind the end hood and out of the way, for instance, so as not to interfere with downed and possibly tangled corn plants as they are received by the corn header. The support member has an elongate free end extending upwardly and outwardly relative to the pivotal axis from the mounting end or element to a terminal end portion spaced from the mounting end. The extension includes a sheet which is preferably of a flexible material such as plastics or the like, mounted to the free end of the support member along a sufficient portion of the length thereof and extending downwardly therefrom, so as to cooperate with the end hood when the support member is in the forwardly extending position or positions, so as to serve as a barrier to the passage of corn between the support member and the end hood and to deflect ears into an adjacent crop gathering channel. The pivotability of the extension allows it to be positioned best for present conditions, such as row spacings, crop heights and other conditions, as well as for optimizing effectiveness, such as for guiding the upper portions of corn plants moving along the channel into better alignment with snapping rolls located at a rearward location therein for pulling the corn plants rapidly downwardly for stripping or snapping the ears therefrom, and when it is not desired or required to use the extension, such as when harvesting a section of downed corn, for movement to the stored, out of the way position. Then, when use is again desired or required, the extension can be simply and easily pivoted to the deployed position or positions.

According to another preferred aspect of the invention, the sheet has a lower portion that cooperates with a side of the end hood defining a peripheral side of the adjacent crop gathering channel, for guiding and deflecting corn stalks and ears toward the channel. For instance, the lower portion can drape over a portion of the length of the side, or can have a lower edge that conforms to and extends along a section of the side, to provide an essentially uninterrupted or continuous surface from the free end of the support member to the channel. The free end of the support member preferably has an angular shape or is otherwise shaped and/or oriented so as to provide maximum height in the vicinity of the snapping rolls for better containing and deflecting ears toward and into the crop gathering channel, and the terminal end is lower, so as to provide a relatively smooth transition from the snout, to reduce the occurrence of corn plants snagging or catching thereon.

DETAILED DESCRIPTION OF THE INVENTION

Figure 1:
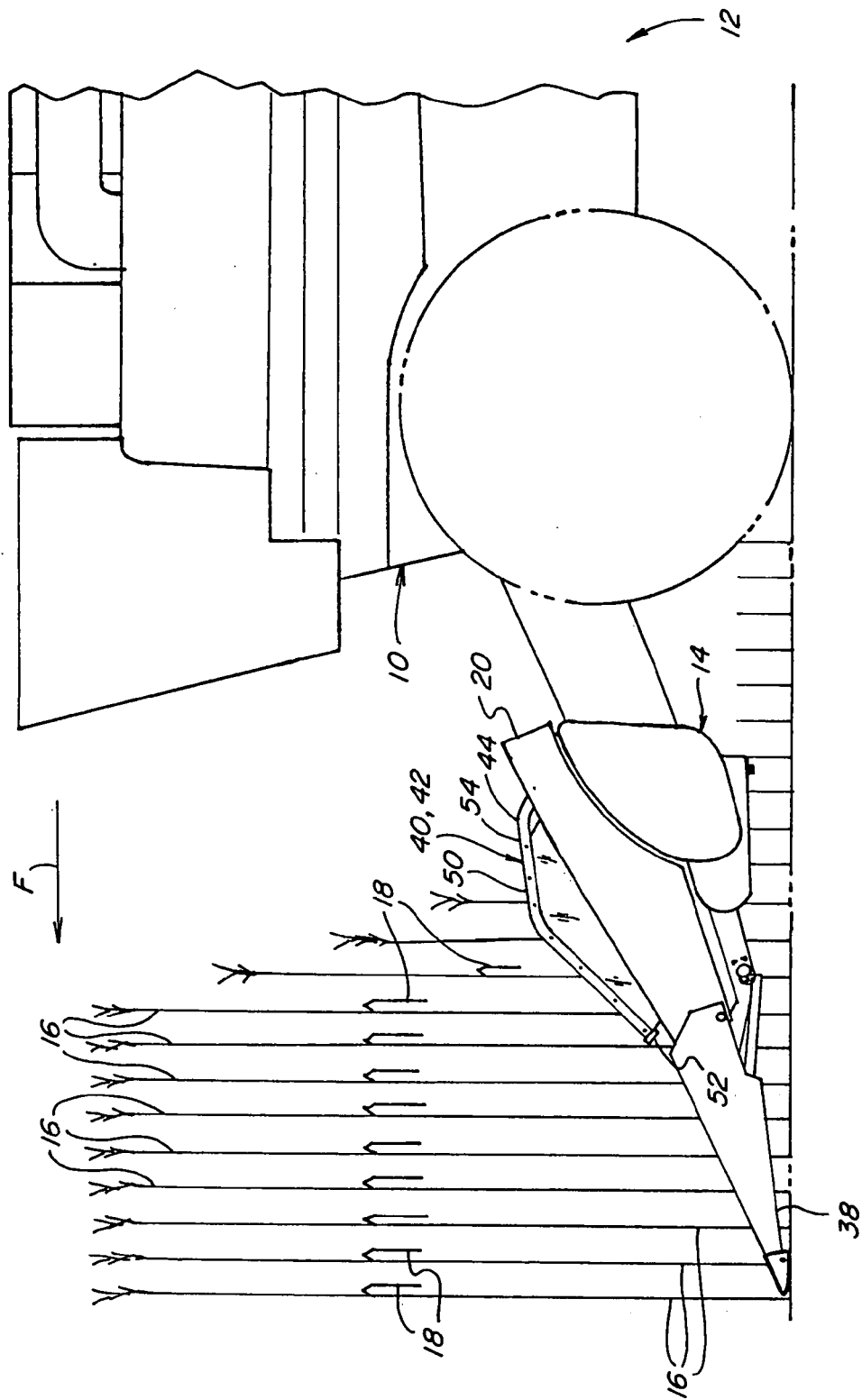
FIG. 1 is a fragmentary, simplified side elevational view of a forward end of an agricultural combine including a corn header including an end hood extension constructed and operable according to the teachings of the present invention, shown in a deployed position.
Figure 2:
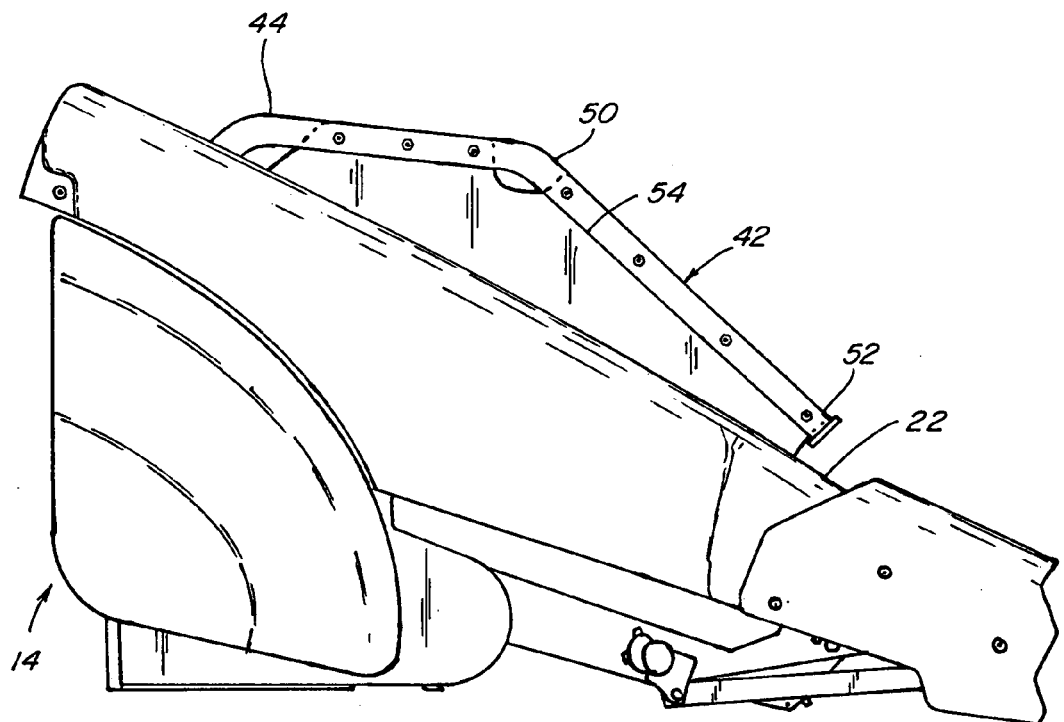
FIG. 2 is an enlarged fragmentary side elevational view of an opposite side of the header, showing another end hood and extension according to the invention, which is a mirror image of the end hood and extension of FIG. 1.
Figure 3:
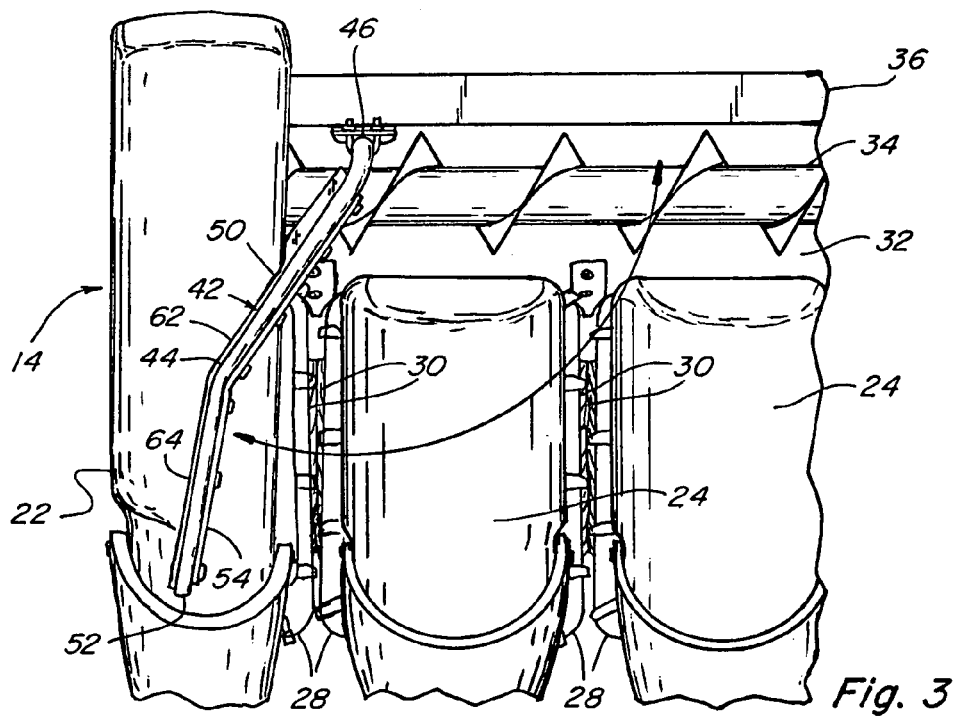
FIG. 3 is a fragmentary top view of the side of the header of FIG. 2, showing the extension in the deployed position, and illustrating with an arrow, pivotability of the extension to a stored position.
Figure 5:
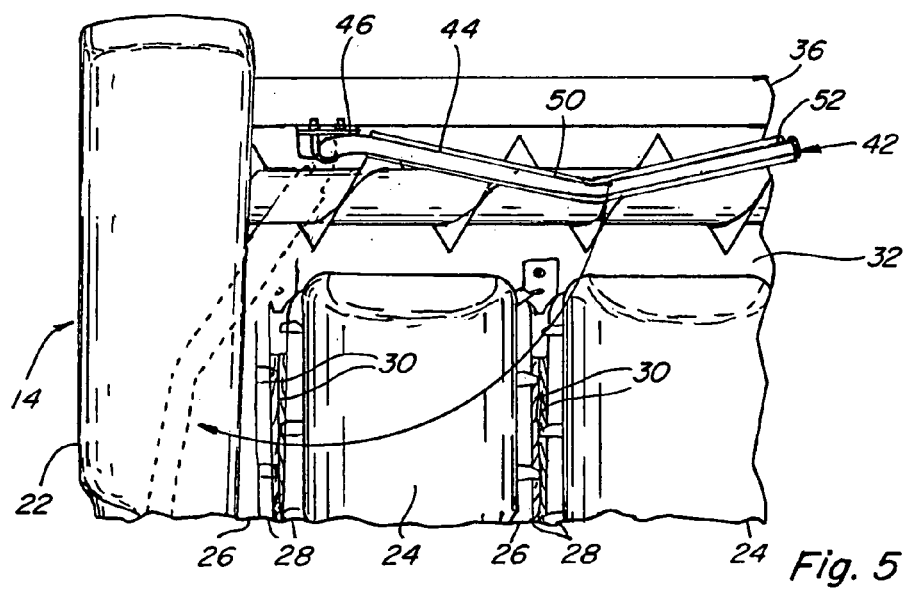
FIG. 5 is another fragmentary top view of the end of the header of FIG. 2, showing the extension pivoted to a stored position.

Referring now to the drawings, in FIG. 1 a forward end 10 of a conventional self-propelled agricultural combine 12 is shown, including a conventional corn header 14 mounted thereto. Combine 12 is illustrated as moving in a forward direction, as denoted by arrow F, over an agricultural field including a plurality of rows of standing corn plants 16, for removing ears 18 therefrom in the well known conventional manner. Referring also to FIG. 2, corn header 14 includes a pair of end hoods 20 and 22 at the opposite sides thereof, which define the width of header 14. As shown in FIGS. 3 and 5, disposed at spaced intervals between end hoods 20 and 22 are a plurality of crop row dividers 24. Adjacent ones of dividers 24 and end hoods 20 and 22 define a plurality of crop gathering channels 26 therebetween, respectively. When moving forwardly over a field, header 14 will be positioned such that crop gathering channels 26 are aligned for receiving respective rows of corn plants 16. Located in each channel 26 is apparatus for stripping or removing ears 18 from corn plants 16, including a pair of endless gathering chains 28 which are counter rotated in a generally horizontal plane along the channel 26 for moving the plants rearwardly into a pair of snapping rolls 30 which counter rotate downwardly for pulling the stalks of the plants downwardly rapidly, as shown in FIG. 1, for snapping or removing ears 18 therefrom. The removed ears 18 are collected in a gathering trough 32 located rearwardly of dividers 24 and channels 26, and trough 32 contains an auger 34 which rotates and includes helical flights for moving the ears toward the center of header 14 for induction into an inlet opening of a feeder of combine 12. Located rearwardly of trough 32 is a transversely extending beam 36 which is a structural element of header 14 and provides support for end hoods 20 and 22 and dividers 24.

Figure 4:
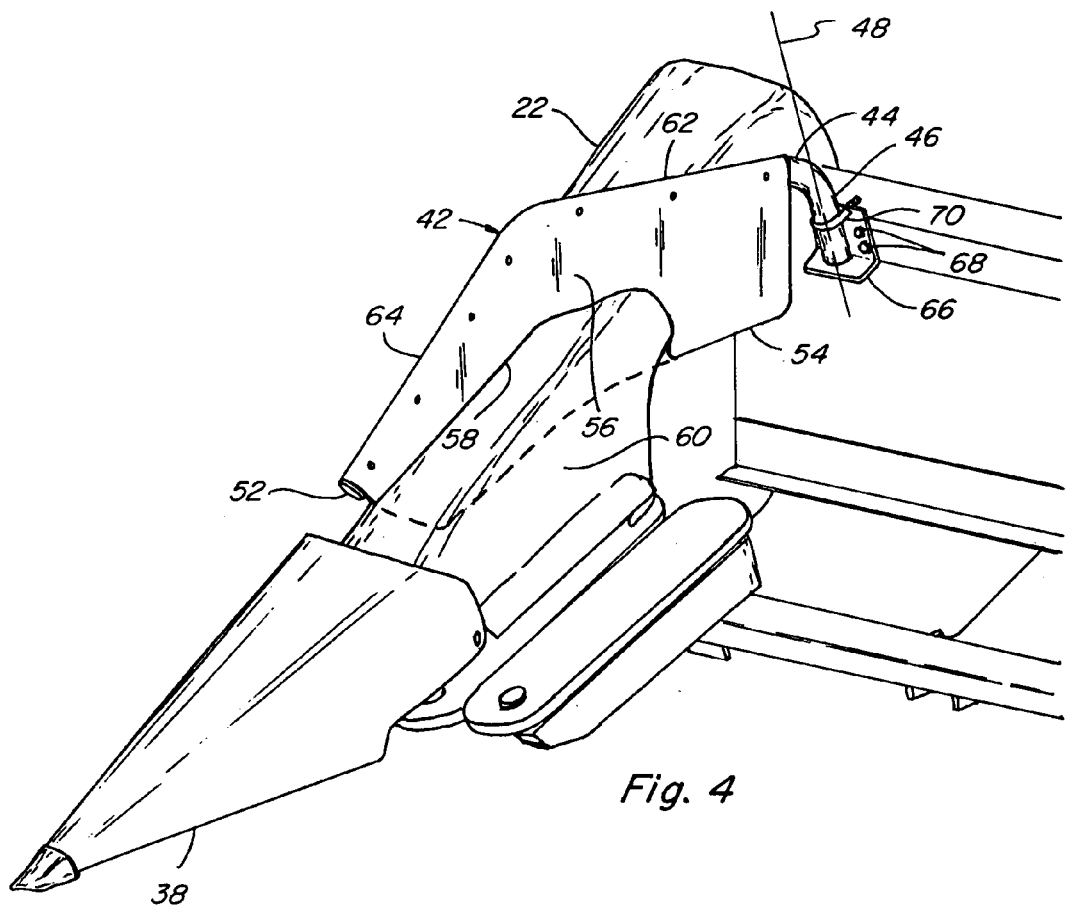
FIG. 4 is a fragmentary perspective view of the side of the end hood of FIG. 2, showing the extension in a deployed position and cooperation of a sheet of the extension with a side of the end hood.

Referring also to FIG. 4, each end hood 20 and 22 includes a forwardly extending snout 38 having an outer surface which tapers upwardly and outwardly in the rearward direction, so as to be more easily movable through spaces between the rows of corn plants and for separating plants of adjacent rows, and plants that have grown and/or were downed together and tangled. Because adjacent ones of snouts 38 taper outwardly, crop gathering channels 26 narrow in the rearward direction, such that the lower portions of stalks of plants 16 of the respective rows are guided into the space between gathering chains 28 in the channel 26. Typically, if plants 16 are standing, when the rows of stalks are fed by gathering chains 28 into snapping rolls 30, they will be rapidly pulled down and ears 18 snapped off in rapid succession. If the upper portions of the plants are not at least generally in alignment with the snapping rolls, it would be anticipated that an undesirable percentage of ears 18 separated from the stalks in the channels 26 adjacent to end hoods 20 and 22 would be propelled upwardly and sidewardly by the separating action of the snapping rolls so as to be cast over the end hood 20 or 22 and lost if not later picked up. Some taller plants may also bend or fold over the end hoods such that the ears can also be lost when the stalks are pulled by the snapping rolls. As noted above, these occurrences may be expected to increase in frequency due to the tendency to construct corn headers lower in profile for better harvesting downed corn.

To limit or prevent such loss of corn ears over end hoods of corn headers such as end hoods 20 and 22 of header 14, end hood extensions 40 and 42 constructed and operable according to the teachings of the present invention are mounted on header 14, for providing a barrier for deflecting and/or guiding corn ears such as ears 18 which are propelled above respective end hoods 20 and 22, or are broken or otherwise separated from the stalk, and would likely be lost over the end hood, toward or into the adjacent crop gathering channel 26. Extensions 40 and 42 are also positioned so as be capable of guiding and supporting the upper portions of tall standing corn plants as they move through channel 26 adjacent to the end hood 20 or 22, such that they are better aligned with snapping rolls 30 and are thus more easily pulled downwardly by rollers 30 with less possibility of loss of ears 18.

Each end hood extension 40 and 42 generally includes an elongate support member 44 of tubular metal such as steel or other suitable construction, including a mounting element or a mounting end 46 mountable to header 14 adjacent to a rear end of the end hood 20 or 22, for pivotable movement about a generally upwardly to downwardly extending pivotal axis 48 (FIG. 4). Support member 44 includes an elongate free end 50 extending upwardly and outwardly from mounting end 46 to an opposite terminal end portion 52. Support member 44 is pivotable with mounting end 46 about pivotal axis 48 between at least one forwardly extending or deployed position extending forwardly from mounting end 46, wherein free end 50 extends generally along and is located a predetermined spaced distance above the end hood 20 or 22 (FIGS. 1, 2, 3 and 4), and a second or stored position oriented at about a 90 degree angle about axis 48 to the forwardly extending or deployed position or positions (FIG. 5). A sheet 54, preferably of a flexible material such as plastics, is mounted to free end 50 and extends downwardly therefrom along substantially the length thereof such that when support member 44 is in the forwardly extending or deployed position or positions, sheet 54 will be positioned generally in the space between free end 50 and end hood 20 or 22.

Referring more particularly again to FIG. 4, sheet 54 has a lower or bottom portion 56 which cooperates with the surface of respective end hood 20 or 22, preferably so as to form an essentially continuous surface extending from support member 44 to the adjacent crop gathering channel 26, for forming the barrier for deflecting and guiding corn ears that come into contact therewith toward and into channel 26. Here, as an example, bottom portion 56 has a bottom edge 58 having a contoured shape corresponding to a sectional shape of the end hood 20 or 22 along the line of contact therebetween. Alternatively, bottom portion 56 could drape partially over a side surface 60 of the end hood 20 or 22 that defines an adjacent peripheral side of the crop gathering channel 26, such as depicted in FIG. 4. Additionally, as best shown in FIGS. 3 and 4, free end 50 of support member 44 preferably has an angled shape including a first portion 62 adjacent to mounting end 46 which, when support member 44 is in the deployed positions, extends partially across a rearward end of channel 26 adjacent to a rearward end of gathering chains 28 and snapping rolls 30, and an adjacent portion of end hood 20 or 22. First portion 62 preferably is oriented at a small acute angle to the forward direction, and extends to and supports a second portion 64. Second portion 64 of support member 44, in turn, extends at a smaller angle to the forward direction, to terminal end 52. Second portion 64 also angles downwardly toward terminal end 52, as best shown in FIGS. 1 and 3. The shapes of first and second portions 62 and 64, and the angular orientation of first portion 62 so as to extend partially across the rearward end of channel 26 adjacent to the rearward end of gathering chains 28 and snapping rolls 30, allows the extension to guide the upper portions of corn plants that may be leaning sidewardly over or toward the end hood into better position or alignment with the crop gathering channel and the snapping rolls, to facilitate successful snapping off or removal of the corn ears and the directing of the snapped off ears into the trough behind the rolls. The lower position of terminal end 52 provides a smooth upward transition region from the surface of the end hood, to reduce the occurrence of plants snagging and catching thereon.

Mounting end 46 of each extension 40 and 42 can be mounted at any convenient location to a header such as header 14, so as to be pivotable between the forwardly extending deployed position or positions and the stored position. Here, as one example, as shown in FIG. 4, to allow positioning the extensions for best operation and so as to be storable out of the way when use is not desired or required, mounting end 46 is shown supported for pivotal movement about axis 48 on an L shape bracket 66 which is connected by bolts 68 to beam 36 adjacent to and rearwardly of crop gathering channel 26 and trough 32. A U-bolt 70 extends around end 46 and through bracket 66 and is held in place by nuts which are tightenable as required to provide a desired ease of pivotability of the extension 40 or 42, and to hold the extension in a selected position. In this way, the extension 40 or 42 can be adjusted when in the deployed position as desired or required for various row spacings, crop heights and other conditions, as well as for optimizing effectiveness, and can be manually pivoted to the stored position when use is not desired or required. Here, it should be noted that extensions 40 and 42 can be mounted at other locations in proximity to the end hood of a corn header, using other structural elements, as desired.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. An extension for a forwardly to rearwardly extending end hood of a corn header defining a forwardly to rearwardly extending crop gathering channel, comprising:

a support member including a mounting end mountable to the header adjacent to a rear end of the end hood rearwardly of an auger located adjacent to a rearward end of the crop gathering channel for pivotable movement about a generally upwardly to downwardly extending pivotal axis, and an elongate free end extending upwardly from the mounting end and having a terminal end portion located a spaced distance from the mounting end, the support member being pivotable about the pivotal axis between at least one position extending forwardly above the auger such that the free end is spaced above the end hood, and a second position oriented at about a 90 degree angle about the pivotal axis relative to the forwardly extending position so as to be located above and behind the auger, and a sheet mounted to the free end and extending downwardly therefrom along substantially the length thereof such that when the support member is in the forwardly extending position the sheet will be positioned generally in the space between the free end and the end hood so as to provide a barrier to the passage of corn between the support member and the end hood.

2. The extension of claim 1 wherein the mounting end is mounted to a sidewardly extending beam of the header supporting the end hood.

3. The extension of claim 2 wherein the elongate free end includes a first elongate portion adjacent to the mounting end and a second elongate portion extending from the first portion to the free end portion, and wherein when the free end is in the at least one forwardly extending position the second portion is positioned above the end hood and adjacent to a side of the forwardly to rearwardly extending crop gathering channel defined by the end hood, and the first portion extends at least partially across a rear portion of the channel including a pair of snapping rolls therein.

4. The extension of claim 3, wherein the mounting end of the support member is mounted to the header adjacent to a rear end of the channel.

5. An extension for a corn harvester header end hood supported in forwardly extending relation to a sidewardly extending beam of the header so as to define a peripheral side of a crop gathering channel, the extension comprising:

a mounting portion mounted to the beam adjacent to a rearward end of the crop gathering channel for pivotal movement about a generally upwardly to downwardly extending axis, an elongate support member connected to the mounting portion and extending upwardly and outwardly therefrom to a terminal end portion, the support member being pivotally positionable with the mounting portion in a first position so as to extend from the channel sidewardly and forwardly with the terminal end portion located above the end hood, the support member being pivotally positionable in a second position extending along the beam; and a sheet supported and extending downwardly from the support member along substantially the length thereof and having a sufficient downward extent along the length such that when the support member is in the first position the sheet will cooperate with the end hood for guiding upper portions of corn plants extending sidewardly away from the crop gathering channel into alignment with the channel and for deflecting loose corn ears that contact the sheet into the channel, wherein the mounting portion and the beam are disposed rearwardly of an auger located adjacent to the rearward end of the crop gathering channel, such that the support member extends over the auger when in the first position and is located above and rearwardly of the auger when in the second position.

6. The extension of claim 5 wherein the sheet has a bottom edge which generally conforms to and forms an upwardly extending continuation of an upper inner side surface of the end hood located adjacent to the crop gathering channel.

7. The extension of claim 5, wherein a bottom portion of the sheet drapes over an upper inner side surface of the end hood located adjacent to the crop gathering channel.

8. The extension of claim 5, wherein the first and second positions are angularly oriented at about a 90 degree angle one to the other.

9. The extension of claim 5, wherein the first position comprises a range of positions wherein the support element extends from the channel sidewardly and forwardly with the terminal end portion located above the end hood.

10. In a corn header including an end hood supported in forwardly extending relation to a sidewardly extending beam of the header to define a peripheral side of a crop gathering channel, the improvement comprising:

a mounting element mounted to the beam adjacent to a rearward end of the crop gathering channel for pivotal movement about a generally upwardly to downwardly extending axis, an elongate support member connected to the mounting portion and extending upwardly and outwardly therefrom to a terminal end portion, the mounting element being pivotable to locate the support member in at least one deployed position extending forwardly along the peripheral side of the channel with the terminal end portion located above the end hood, and the mounting element being pivotable generally horizontally to move the support member from the deployed position to a stored position rearward of the channel and oriented at about a 90 degree angle to the deployed position; and a sheet supported and extending downwardly from the support member along substantially the length thereof and having a sufficient downward extent along the length such that when the support member is in the deployed position the sheet will cooperate with the end hood for guiding upper portions of corn plants extending sidewardly away from the channel toward the channel and deflect loose corn ears that contact the sheet into the channel, wherein the mounting element and the beam are disposed rearwardly of an auger located adjacent to the rearward end of the crop gathering channel, such that the support member extends over the auger when in the at least one deployed position and is located above and behind the auger when in the stored position.

11. In the corn header of claim 10, the sheet having a bottom edge which generally conforms to and forms an upwardly extending continuation of an upper inner side surface of the end hood located adjacent to the crop gathering channel when the support member is in the at least one deployed position.

12. In the corn header of claim 10, the sheet including a bottom portion which drapes partially over an upper inner side surface of the end hood located adjacent to the crop gathering channel when the support member is in the at least one deployed position.

\* \* \* \* \*